June 9, 1959
R. A. BRAUN
2,889,866
APPARATUS FOR FORMING TUBULAR SLEEVES
Filed June 11, 1954
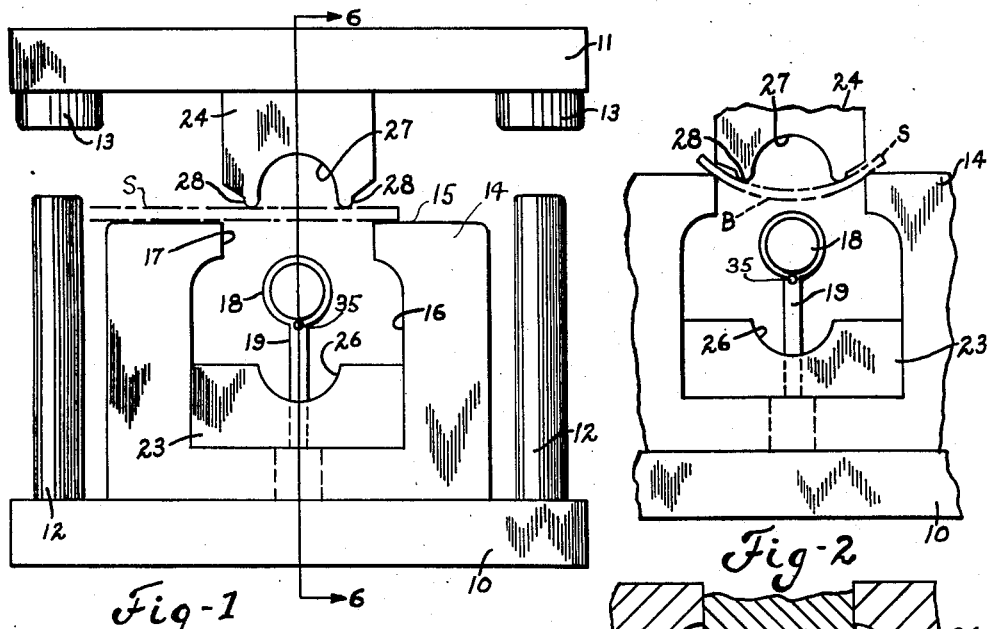
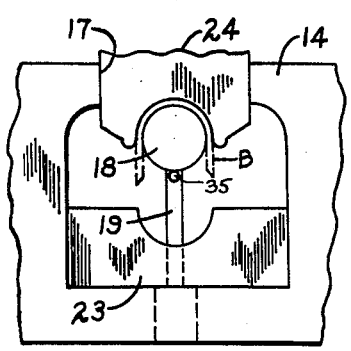
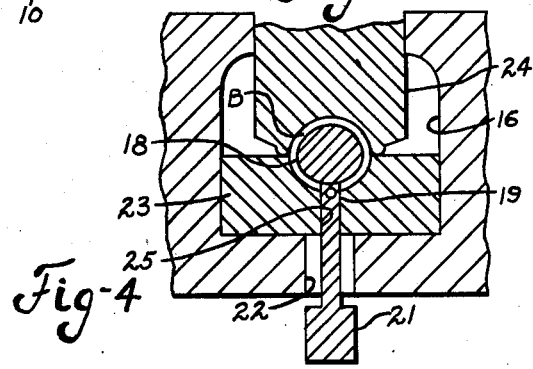
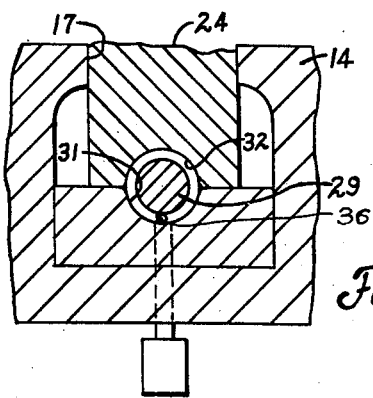
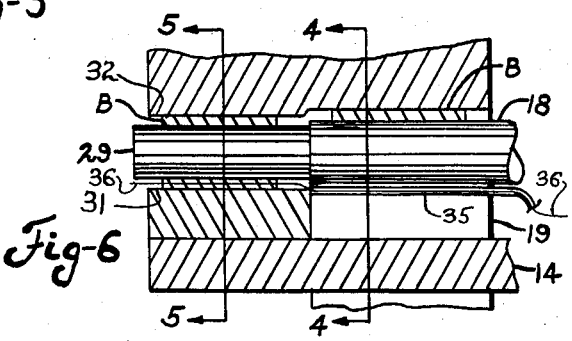
INVENTOR.
Ralph A. Braun
BY
Tom Walker

United States Patent Office 2,889,866
Patented June 9, 1959

2,889,866

APPARATUS FOR FORMING TUBULAR SLEEVES

Ralph A. Braun, Dayton, Ohio, assignor to The W. B. W. Tool Company, Dayton, Ohio, a corporation of Ohio Application June 11, 1954, Serial No. 436,204

10 Claims. (Cl. 153—49)

This invention relates to apparatus for and a method of forming metal sleeves or tubular members of relatively thick sheet stock, on the order, for example, of five thirty-seconds of an inch.

Among other uses, such articles have a utility as a roller portion of heavy roller chains used in mining equipment. Heretofore, these rollers have been manufactured according to a multi-step method involving one or more operations on each of a plurality of machines.

Thus the object of the invention is to simplify the construction as well as the means and mode of operation of apparatus for forming tubular sleeves whereby such apparatus may not only be economically manufactured but will be more efficient and satisfactory in use, have relatively few parts and be unlikely to get out of repair.

A further object of the invention is to obviate the complicated machinery in the forming of such metal sleeves, it being contemplated to provide a simple die mechanism for the purpose which can be installed in an ordinary press and which can be easily removed so that the press may be used for other work.

It is another object of the invention to enable thick sheet stock as described to be formed to a relatively small diameter, for example one inch, it being contemplated in this connection to provide a novel mounting for the mandrel or arbor so that it may sustain the high forming pressures required.

It is a further object of the invention to complete the formation of a tubular sleeve as described in two successive operations of the die mechanism.

Still another object of the invention is to provide for complementary matching engagement of the side edges of a sleeve blank without the necessity of preparatory deforming thereof.

A still further object of the invention is to combine the blanking out step of the method with a further step in which the side edges of the blank are cut with a matching angularity.

A further object of the invention is to provide means for the brazing of the side edges of the formed sleeve.

A further object of the invention is to provide means whereby the brazing material may be automatically advanced and located intermediate the side edges of the sleeve during the forming operation thereof.

A further object of the invention is to provide an apparatus and method for forming tubular sleeves posessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof and the mode of operation, as hereinafter described or illustrated in the accompanying drawings, or their equivalents.

Referring to the drawing, wherein is found the preferred but obviously not necessarily the only form of embodiment of the invention:

Fig. 1 is a view in end elevation of the die mechanism installed in a press, with the press in open position;

Fig. 2 is a detail view similar to Fig. 1, showing the operation of the die mechanism as it starts to close;

Fig. 3 is a view similar to Fig. 2, showing one die member fully closed;

Figs. 4 and 5 are cross sectional views taken substantially along the lines 4—4 and 5—5 of Fig. 6 and showing respective parts of the die mechanism wherein the sleeve is partly formed and finally formed; and Fig. 6 is a view in longitudinal section taken substantially along the line 6—6 of Fig. 1.

Like parts are indicated by similar characters of reference throughout the several views.

Referring to Fig. 1 of the drawing, a fragment only of a press is disclosed, consisting of a stationary bed plate 10 and an overlying reciprocable pressure plate 11. The plate 10 mounts corner posts 12 engageable by studs 13 on plate 11 to limit and define the extent of approaching motion permitted the pressure plate 11 toward the bed plate 10. Detachably mounted upon the bed plate 10 is a body 14 which may be of fabricated or integral construction but which in either event presents a table or work supporting surface 15, an internal chamber 16 open at its opposite ends and an opening 17 through the surface 15 into the chamber 16. The opening 17 is rectangular in shape and the sides thereof have sharp edges for shearing purposes, the distance between the sides being slightly less than the circumference of the finished sleeve, for reasons which will hereinafter more clearly appear.

Longitudinally disposed within the chamber 16 is a cylindrical arbor or mandrel 18 seated directly on the bed plate 10 by virtue of an integral vertical web 19 which terminates at its bottom in a relatively broad base 21 received in a slot 22 (Fig. 4) in the body 14. The mandrel 18 is supported by the web 19 in a position immediately underlying the opening 17 and centrally of the sides thereof.

A pair of dies 23 and 24 are arranged for cooperation with the mandrel 18. The die 23 is mounted in the chamber 16 and is suitably connected to the body 14 so as to prevent relative movement of the parts. The die 23 has an embracing or telescoping relation to the web 19 permitted by a slot 25 in the die. The upper or work engaging end of the die 23 is formed with a longitudinal, semi-cylindrical cavity or recess 26.

The die 24 is secured to the pressure plate 11, and, in the open position of the press as shown in Fig. 1, lies above the level of the table 15 and in a position of registry with the opening 15. The width of the die 24 approximately corresponds to the width of the opening 17 and the sides of the die are sharp edged so that in conjunction with the edges of the opening 17 they may shear a blank to size from sheet stock lying on the table 15 over the opening 17. The lower or work engaging end of die 24 is formed with a semi-cylindrical cavity or recess 27 complementary to the recess 26 in die 23. According to the further formation of the work engaging face of die 24, the sides thereof taper inwardly and downwardly to define projecting lands 28 spaced inwardly from the sides of the die. The lands 28 may be rounded, as shown, in order not to cut the material of the blank.

In the operation of the apparatus described, metal sheet stock S is fed onto the table 15, with the free end thereof being successively indexed into position overlying the opening 17, as shown in Fig. 1. During positioning of the sheet stock the press is open. At the start of a forming operation, the pressure plate 11 descends and lands 28 on die 24 effect a preliminary deforming of that part of the sheet to be blanked out, cupping such portion about the longitudinal axis thereof. When, after such preliminary cupping, the side edges of the die reach the side edge of opening 17 continued motion of the die shears a blank B from the sheet as shown in Fig. 2. It will be noted that the shearing cuts are made along lines which in the cupped position of the blank are parallel to the longitudinal axis of the blank. Since such cuts are taken while the blank is cupped, the side edges of the blank are reversely curled into the shape of a cylinder.

Such reverse curling of the blank takes place as the die 24 thrusts the blank B through the opening 17 and onto the mandrel 18, the mandrel being received in the recess 27 and the blank being accordingly wrapped around the mandrel and caused to assume the U-shaped formation shown in Fig. 3.

The arbor 18 and its supporting members 19 and 21 are supported in the position shown in Figs. 1 through 3, inclusive, by means of an air pad. Upon completion of the preliminary forming, as shown in Fig. 3, the air pad and its piston are permitted to descend under pressure of the die 24. Thus, with the blank B held in the position shown in Fig. 3 the die 24 and arbor 18 are lowered so as to bring the ends of the blank B into engagement with the recess 26 of the die 23. The ends of the blank B are thereby curled into the position shown in Fig. 4 where they abut the web 19. As shown in Fig. 4 the sleeve is slightly oval in shape at this stage of the forming operation due to the fact that the web 19 is still intermediate the ends of the blank.

Although a sleeve as produced in the operations of Figs. 1 through 4 may serve a useful purpose to so be considered a finished product, the invention contemplates a further finishing thereof wherein the free ends are drawn into touching relation. To this end, the mandrel 18 is formed with a reduced diameter extension 29 (Figs. 5 and 6). Also, the semi-cylindrical recesses in the dies 23 and 24 have respective extensions 31 and 32 of correspondingly smaller radius. The web 19 supporting the mandrel 18 terminates short of underlying relation to the extension 29.

According to the further mode of operation of the apparatus, therefore, when the dies 23 and 24 separate from the position shown in Fig. 4, the partly finished sleeve blank B is moved axially along the mandrel (by any suitable manual or automatic means) to a position surrounding the mandrel extension 29. Then on the next succeeding forming stroke of the dies the semi-cylindrical recesses 31 and 32 engage and squeeze the blank to the finished form of Fig. 5. It will be understood that while one sleeve is being finished on the mandrel extension 29 a following blank is being partly formed on the main portion of the mandrel as previously described, and, also, that a following blank will eject a finished blank from the machine as it in turn is moved into position for finishing.

As pointed out above, one of the features of the present invention is the ability to provide means for brazing the formed sleeve. With such brazing operation the sleeve in effect becomes a seamless unit having an uninterrupted inner and outer peripheral surface. The sleeve is preferably copper brazed and to this end there is provided means for inserting either a copper ribbon or wire intermediate the abutting ends of the blank B prior to the closure thereof in the operation shown in Fig. 5.

Extending longitudinally through the web 19 in closely adjacent relation to the arbor 18 is a small passageway 35 through which is directed a strip of copper 36. The copper strip is brought from a supply thereof (not shown) and directed through the passageway 35 so that it may project therefrom and be brought into alignment intermediate the adjacent edges of the sleeve. Thus, during the last forming operation (Fig. 5) the copper strip 36 is held between the abutting edges of the sleeve. Special feeding means for the copper strip 36 are unnecessary since it will be automatically advanced through the apparatus by removal of the completed sleeve from the end 29 of the arbor.

The continuous copper wire 36, if left unsevered, will tend to hold the completed sleeves in a strip formation so that they may be handled as a unit rather than individually. This facilitates the transfer of the completed sleeves to the brazing furnace where the brazing of the abutting ends of the sleeve is completed. When finished, the blank, thus formed, provides a substantially continuous peripheral surface both inside and outside and is in effect substantially equivalent to a seamless sleeve.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. Apparatus for forming tubular sleeves from strip stock, including a support having a plane surface upon which the strip stock is fed presenting a blank opening having shearing edges, a die reciprocable through said opening to shear a blank from the strip, a convex formation on the end of said die to produce a reverse cupping of the blank preliminary to shearing thereof to form the edges of the blank with a mating angularity, a semi-cylindrical recess in said end of the die having said convex formation on opposite sides thereof, and a mandrel and an opposing die cooperating with the first said die to form the blank to a tubular shape.

2. Apparatus for forming tubular sleeves from sheet stock, including a stationary body presenting a chamber, a plane surface on the top thereof upon which the sheet stock is disposed, and an opening from said plane surface into said chamber, said opening having shearing edges, a mandrel extending longitudinally in said chamber, the chamber in said body having a larger lateral dimension adjacent the top of the mandrel than the corresponding dimension of the opening into said chamber, a web of material integral with said mandrel adjustably supported relative to said body, two oppositely disposed dies, one in said chamber relative to which said mandrel reciprocates and the other reciprocable through said opening toward and from said mandrel, said other die acting in cooperation with the shearing edges on said opening to shear a blank from the sheet stock and press it against the mandrel, and semi-cylindrical recesses in said dies cooperating to form the blank into a substantially cylindrical shape about said mandrel.

3. Apparatus according to claim 2, wherein said web of material precludes closure of the blank about the mandrel, characterized by a smaller diameter extension on said mandrel and corresponding extensions of said recesses whereby a partly formed sleeve may be adjusted axially along said mandrel and acted upon by said dies a second time to form a completed sleeve.

4. Apparatus for forming tubular sleeves from sheet stock, including a cylindrical mandrel presenting two diameters, a stationary rib in underlying supporting relation to the larger diameter portion of said mandrel, relatively movable upper and lower dies presenting semi-cylindrical recesses complementary to the larger diameter portion of said mandrel and extensions of said recesses complementary to the smaller diameter portion of said mandrel, the semi-cylindrical recess in said lower die being split to accommodate said rib, and a sheet stock support having a surface in overlying relation to said mandrel, said surface presenting an opening having shearing edges upon which a blank is sheared by said upper die, said blank being partly formed on the larger diameter portion of said mandrel and then sihfted to the smaller diameter portion thereof for finishing.

5. Apparatus for forming tubular sleeves according to claim 4, characterized in that the distance between said shearing edges is less than the circumference of the formed sleeve, said upper die being suitably formed to effect a reverse cupping of the blank preliminary to shearing so that the blank may pass through said opening and so that the sheared edges of the blank will have a mating angularity.

6. A method of forming a tubular sleeve from a rectangular flat blank, including the successively performed steps of cupping the blank in one direction about its longitudinal axis thereafter shearing the side edges of the blank while so cupped by cuts made along lines parallel to the longitudinal axis of the blank in the cupped position of the blank, and forming the blank in an opposite direction about its longitudinal axis over a mandrel or like device.

7. Apparatus for forming a tubular sleeve from a rectangular flat blank, including a blank support having a surface presenting an opening the sides of which define shearing edges, a mandrel supported beneath said opening intermediate said shearing edges, a die movable inward through said opening toward said mandrel, the work engaging face of said die presenting a semi-cylindrical recess complementary to the mandrel and further presenting step-down shoulders on either side of said recess, said shoulders terminating in shearing edges cooperative with the shearing edges of said opening, said die performing in moving toward said mandrel a series of steps comprising cupping the blank which is supported over said opening, shearing the side edges of the blank and reversely cupping or forming the blank over the mandrel, and another die coacting with the first said die on the opposite side of said mandrel to form the blank to a tubular shape, said other die having a semi-cylindrical recess complementary to the recess in the first said die and aligned therewith.

8. Apparatus for forming tubular sleeves from strip stock, including a support having a plane surface upon which the strip stock is fed presenting a blank opening having shearing edges, a die reciprocable through said opening to shear a blank from the strip, a convex formation on the end of said die to produce a reverse cupping of the blank preliminary to shearing thereof to form the edges of the blank with a mating angularity, a mandrel, an opposing die cooperating with the first said die to form the blank to a tubular shape, and means for presenting intermediate the sheared edges of the blank a brazing material prior to the forming of the blank to a tubular shape.

9. An apparatus for forming tubular sleeves from sheet stock, including a cylindrical mandrel having aligned portions of greater and lesser diameter, means for pressing an unformed blank about the mandrel portion of greater diameter, the blank only partly encircling said portion whereby to leave an open seam therein, such partly formed blank being movable axially along said mandrel to the portion of lesser diameter, and means for further pressing said blank about said portion of lesser diameter to close said seam, said pressing means acting simultaneously upon an unformed blank and a partly formed blank respectively to produce a partly formed blank and a finished blank, axial movement of said partly formed blank as described serving to eject the finished blank from the apparatus.

10. An apparatus according to claim 9, characterized by means for holding a strip of brazing material in parallel offset relation to said mandrel, said strip being movable relatively to said holding means and to said mandrel, said strip passing through the open seam of a partly formed blank and being locked in the seam of a finished blank by the closing thereof, ejection of said finished blank serving to advance said strip.

References Cited in the file of this patent

UNITED STATES PATENTS

| | | |
|---|---|---|
| 638,261 | McCool | Dec. 5, 1899 |
| 689,502 | Markham | Dec. 24, 1901 |
| 1,899,143 | Frahm | Feb. 28, 1933 |
| 2,092,255 | Keller | Sept. 7, 1937 |
| 2,099,624 | Robarge | Nov. 16, 1937 |
| 2,170,473 | Fitch | Aug. 22, 1939 |
| 2,480,378 | Myers | Aug. 30, 1949 |
| 2,505,718 | Nowak | Apr. 25, 1950 |